(12) United States Patent
Yoshigoe (10) Patent No.: US 7,973,507 B2
(45) Date of Patent: Jul. 5, 2011

(54) RAINDROP DETECTING DEVICE AND METHOD OF DETERMINING RAINDROP AMOUNT

(75) Inventor: Taketoshi Yoshigoe, Kariya (JP)

(73) Assignee: Denso Corporation, Kariya (JP)

( * ) Notice: Subject to any disclaimer, the term of this patent is extended or adjusted under 35 U.S.C. 154(b) by 544 days.

(21) Appl. No.: 11/896,545

(22) Filed: Sep. 4, 2007

(65) Prior Publication Data

US 2008/0136361 A1 Jun. 12, 2008

(30) Foreign Application Priority Data

Dec. 6, 2006 (JP) ................. 2006-329861

(51) Int. Cl.
H02P 1/04 (2006.01)
(52) U.S. Cl. ......... 318/483; 318/466; 318/467; 318/468
(58) Field of Classification Search .................. 318/483, 318/466, 467, 468
See application file for complete search history.

(56) References Cited

U.S. PATENT DOCUMENTS

| | | | |
|---|---|---|---|
| 4,740,735 A * | 4/1988 | Hayashi .................. | 318/483 |
| 6,239,570 B1 * | 5/2001 | Tanaka et al. ............ | 318/483 |
| 6,420,845 B1 * | 7/2002 | Mackel et al. ............ | 318/443 |
| 6,657,410 B1 * | 12/2003 | Berger et al. ............. | 318/483 |
| 6,864,655 B2 * | 3/2005 | Schmitt et al. ........... | 318/443 |
| 6,958,585 B2 * | 10/2005 | Kim ......................... | 318/2 |
| 7,019,321 B2 | 3/2006 | Kokuryo et al. | |
| 7,095,199 B2 * | 8/2006 | Hirose et al. ............. | 318/444 |
| 7,098,618 B2 * | 8/2006 | Morishita ................. | 318/444 |
| 7,154,241 B2 * | 12/2006 | Kokuryo et al. ......... | 318/483 |
| 7,235,944 B2 * | 6/2007 | Morishita ................. | 318/483 |

FOREIGN PATENT DOCUMENTS

| | | |
|---|---|---|
| JP | 8-72641 | 3/1996 |
| JP | 2000-85538 | 3/2000 |
| JP | 2002-046580 | 2/2002 |
| JP | 2002-277386 | 9/2002 |

OTHER PUBLICATIONS

Office Action (1 pg.) dated Jan. 25, 2011 issued in corresponding Japanese Application No. 2006-329861 with an at least partial English-language translation thereof (2 pgs.).

* cited by examiner

Primary Examiner — Walter Benson
Assistant Examiner — David S Luo
(74) Attorney, Agent, or Firm — Nixon & Vanderhye P.C.

(57) ABSTRACT

A raindrop detecting device includes a raindrop sensor, and a controller. The raindrop sensor is disposed in a wiping area of a wiper blade on a front windshield, and outputs a detection signal regarding a raindrop amount. The controller activates the wiper blade based on the detection signal, and sets a prohibition period for which the raindrop sensor is prohibited from determining the raindrop amount. The raindrop sensor outputs signals when raindrop collected by the wiper blade passes above the raindrop sensor in a reciprocating wiping operation. The controller calculates the prohibition period of a second reciprocating wiping operation based on the signals of a first reciprocating wiping operation.

19 Claims, 5 Drawing Sheets

RAINDROP DETECTING DEVICE AND METHOD OF DETERMINING RAINDROP AMOUNT

CROSS REFERENCE TO RELATED APPLICATION

This application is based on Japanese Patent Application No. 2006-329861 filed on Dec. 6, 2006, the disclosure of which is incorporated herein by reference in its entirety.

BACKGROUND OF THE INVENTION

1. Field of the Invention

The present invention relates to a raindrop detecting device and a method of determining a raindrop amount.

2. Description of Related Art

A raindrop detecting device typically includes a raindrop sensor, which is an optical sensor having a light-emitting element and a light-receiving element. The light-emitting element emits light, and the emitted light is reflected by a surface of a front windshield. The light-receiving element is located such that the reflected light can be received by the light-receiving element.

When any raindrop does not exist in a detection area of the raindrop sensor, the front windshield reflects almost all the emitted light and the reflected light is received by the light-receiving element. In contrast, when raindrop exists in the detection area of the raindrop sensor, not all of the emitted light is reflected by the front windshield. That is, a part of the emitted light travels outside of the front windshield, due to the raindrop. Therefore, an amount of light incident into the light-receiving element is reduced, compared with a case in which any raindrop does not exist. When the amount of light incident into the light-receiving element is reduced, a signal output from the light-receiving element is lowered. When the lowering of the signal output from the light-receiving element is detected, a raindrop amount can be determined to increase. That is, the raindrop amount is determined based on the signal output from the light-receiving element. Therefore, a wiper can be controlled based on the determined raindrop amount.

Here, JP-A-2002-46580 discloses a raindrop detecting device. When a wiper is activated such that a wiper blade wipes raindrop from a front windshield, the raindrop wiped by the wiper blade is collected in a moving direction of the wiper blade. That is, the raindrop moves along a surface of the front windshield together with the wiper blade. Because a raindrop sensor of the raindrop detecting device is located in a wiping area of the wiper blade, the collected raindrop passes through a detection area of the raindrop sensor, when the wiper blade passes through the detection area of the raindrop sensor. That is, an amount of water passing through the detection area of the raindrop sensor becomes large due to the collected raindrop, compared with an amount of raindrop regarding rainfall.

In this case, an amount of light incident into the light-receiving element is much reduced, so that the raindrop detecting device may erroneously determine that it is raining heavily. In order to prevent this erroneous determination, the raindrop detecting device is prohibited from performing the determination of the raindrop amount for a predetermined period while the wiper is operating. The predetermined period represents a period that the wiper blade passes through the detection area of the raindrop sensor and the adjacent area.

The predetermined period is set longer such that the wiper blade secures to be located outside of the detection area of the raindrop sensor when the determination is to be performed. That is, the predetermined period is set by adding a leeway period to a period that the wiper blade is located inside of the detection area of the raindrop sensor.

The period that the wiper blade is located inside of the detection area of the raindrop sensor can be calculated based on a position of the raindrop sensor and a moving speed of the wiper blade. The leeway period is to be set in consideration of a variation of the moving speed of the wiper blade. For example, a manufacturing variation of the wiper blade, a wear of the wiper blade, or a variation of a friction coefficient between the wiper blade and a glass constructing the front windshield causes the variation of the moving speed of the wiper blade. Because the leeway period has to be set by taking these variation factors into consideration, the leeway period becomes long, so that a period allowing to perform the determination of the raindrop amount becomes short. In this case, accuracy for determining the raindrop amount may be lowered.

Further, a timing and a length of the predetermined period depends on a position relationship between a wiping area of the wiper blade and the raindrop sensor. Therefore, the timing and the length of the predetermined period are required to be set relative to each vehicle type. That is, a specific controller, e.g., microcomputer, may be needed relative to each vehicle type.

SUMMARY OF THE INVENTION

In view of the foregoing and other problems, it is an object of the present invention to provide a raindrop detecting device, and a method of determining a raindrop amount.

According to a first example of the present invention, a raindrop detecting device includes a raindrop sensor and a controller. The raindrop sensor is disposed in a wiping area of a wiper blade on a front windshield, and outputs a detection signal regarding a raindrop amount. The wiper blade performs reciprocating wiping operations. The controller activates the wiper blade based on the detection signal, and sets a prohibition period for which the raindrop sensor is prohibited from determining the raindrop amount while the wiper blade is activated. The raindrop sensor outputs a first signal when raindrop collected by the wiper blade passes above the raindrop sensor while the wiper blade is moved outward from an initial position in a reciprocating wiping operation. The raindrop sensor outputs a second signal when raindrop collected by the wiper blade passes above the raindrop sensor while the wiper blade is moved homeward to the initial position in the reciprocating wiping operation. The controller calculates the prohibition period of a second reciprocating wiping operation to be performed after a first reciprocating wiping operation, based on the first signal and the second signal of the first reciprocating wiping operation.

According to a second example of the present invention, a raindrop detecting device includes a raindrop sensor and a controller. The raindrop sensor is located in a wiping area of a wiper blade of a windshield, and detects a raindrop amount. The controller activates the wiper blade based on the detected raindrop amount, and sets a prohibition period for which the raindrop sensor is prohibited from detecting the raindrop amount while the wiper blade is activated. The raindrop sensor outputs a signal when raindrop collected by the wiper blade passes above the raindrop sensor, and the controller calculates the prohibition period based on the signal.

According to a third example of the present invention, a method of determining a raindrop amount in a wiping area of a wiper blade of a windshield includes a detecting, a calculating and an enabling. In the detecting, a passing timing of the wiper blade is detected to pass above a raindrop sensor disposed on the windshield. In the calculating, a period allowing the raindrop sensor to detect the raindrop amount is calculated based on the passing timing of the wiper blade. In the enabling, the raindrop sensor is enabled to output a detection signal indicative of the raindrop amount only for the allowed period.

Accordingly, accuracy for determining the raindrop amount can be improved, and the device and method can be used for any vehicle type.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
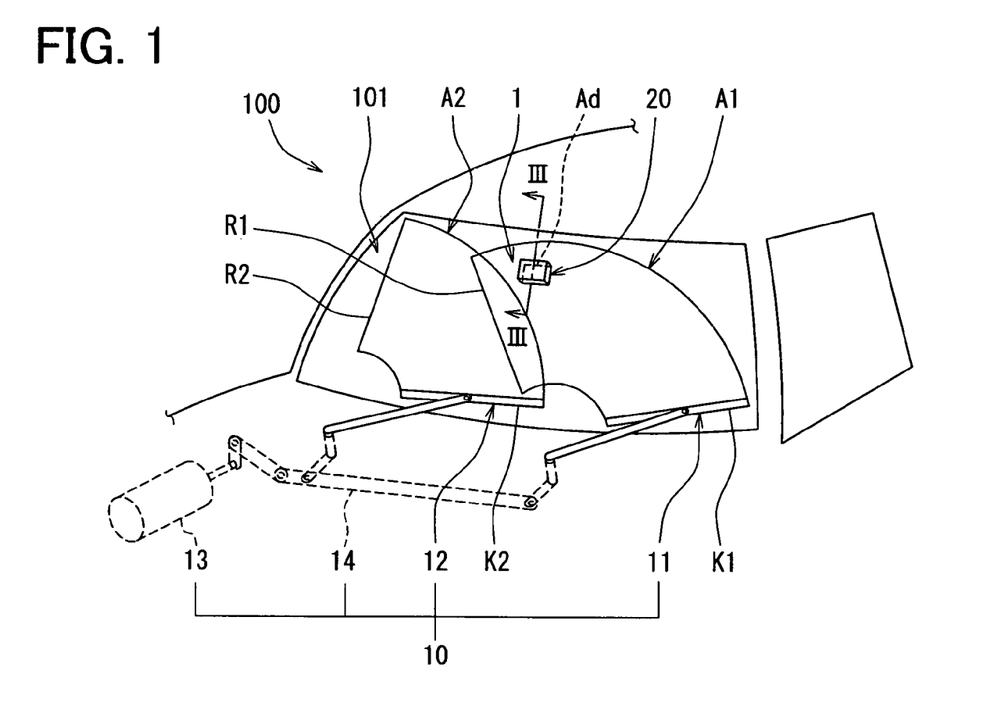
FIG. 1 is a schematic diagram showing a raindrop detecting device mounted on a vehicle, according to a first embodiment of the present invention.

As shown in FIG. 1, a raindrop detecting device 1 is mounted on a vehicle 100 in a first embodiment. The vehicle 100 includes a wiper 10 constructed by a wiper blade 11, 12, a wiper motor 13 and a transmission (link) mechanism 14. The wiper motor 13 generates a force driving the wiper blade 11, 12 in response to a driving signal. The wiper blade 11, 12 wipes an area A1, A2 of a front windshield 101 of the vehicle 100. Specifically, the wiper blade 11, 12 is moved from an initial position K1, K2 to a turning position R1, R2. Then, the wiper blade 11, 12 is moved from the turning position R1, R2 to the initial position K1, K2. That is, the wiper blade 11, 12 travels between the initial position K1, K2 and the turning position R1, R2.

Figure 2:
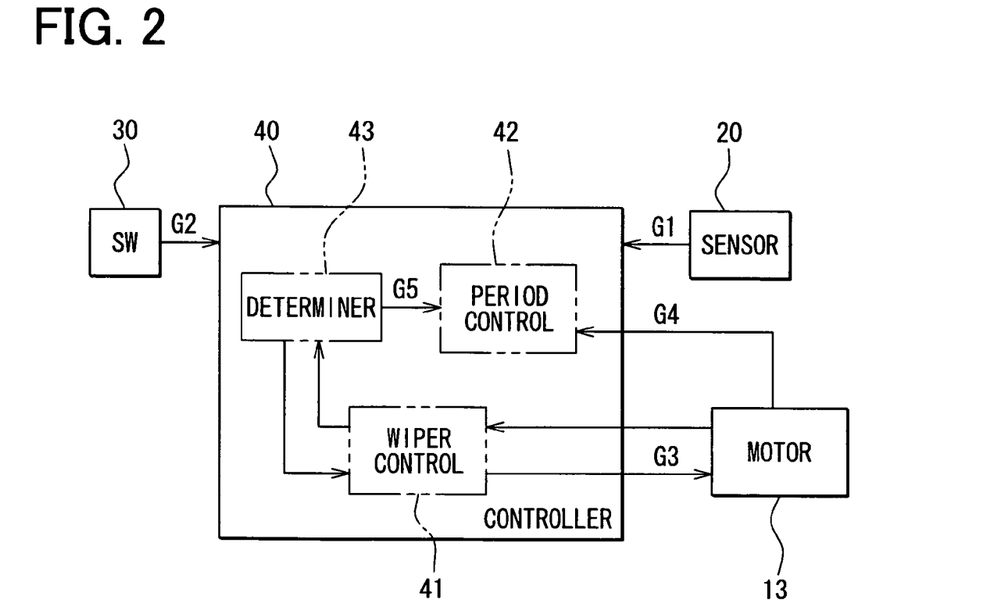
FIG. 2 is a schematic block diagram showing the raindrop detecting device.

As shown in FIGS. 1 and 2, the raindrop detecting device 1 includes a raindrop sensor 20 for outputting a detection signal G1. The detection signal G1 represents a raindrop amount, that is, an amount of raindrop existing in a detection area Ad of the area A1 of the front windshield 101. When any raindrop does not exist in the detection area Ad, a level of the detection signal G1 is approximately uniform. When a raindrop adheres onto the front windshield 101 in the detection area Ad, the level of the detection signal G1 is changed. If raindrop water collected by the wiper blade 11 passes through the detection area Ad, the change of the level of the detection signal G1 is much larger compared with a case where a raindrop adheres onto the front windshield 101 in the detection area Ad.

The raindrop detecting device 1 further includes a controller 40 (microcomputer) shown in FIG. 2. The detection signal G1 output from the raindrop sensor 20 and a signal G2 output from a wiper switch 30 to be operated by a user of the vehicle 100 are input into the controller 40. Further, the controller 40 controls the wiper motor 13 based on the signals G1, G2.

As shown in FIG. 1, the wiper motor 13 transmits a driving force to the wiper blade 11, 12 through the transmission mechanism 14. Thereby, the wiper blade 11, 12 is moved from the initial position K1, K2 to the turning position R1, R2, then, is moved from the turning position R1, R2 to the initial position K1, K2. Thus, the wiper blade 11, 12 wipes the area A1, A2 defined between the initial position K1, K2 and the turning position R1, R2. The area A1, A2 has a fan shape, for example.

As shown in FIG. 2, the controller 40 includes a wiper control 41, a period control 42 and a determiner 43. The wiper control 41 outputs a driving signal G3 into the wiper motor 13 to activate the wiper blade 11, 12. The wiper motor 13 generates a driving force in response to the driving signal G3, and outputs an operation signal G4 indicative of the activation of the wiper blade 11, 12 into the period control 42. The period control 42 sets a prohibition period, for which a raindrop amount determination is prohibited, to be described below. The signals G3, G4 will be described below.

As shown in FIG. 1, the raindrop sensor 20 is located at an upper part of the area A1 to be wiped by the wiper blade 11. The raindrop sensor 20 is arranged adjacent to the turning position R1, and disposed on an inner surface of the front windshield 101, that is, at a vehicle compartment side of the vehicle 100.

Figure 3:
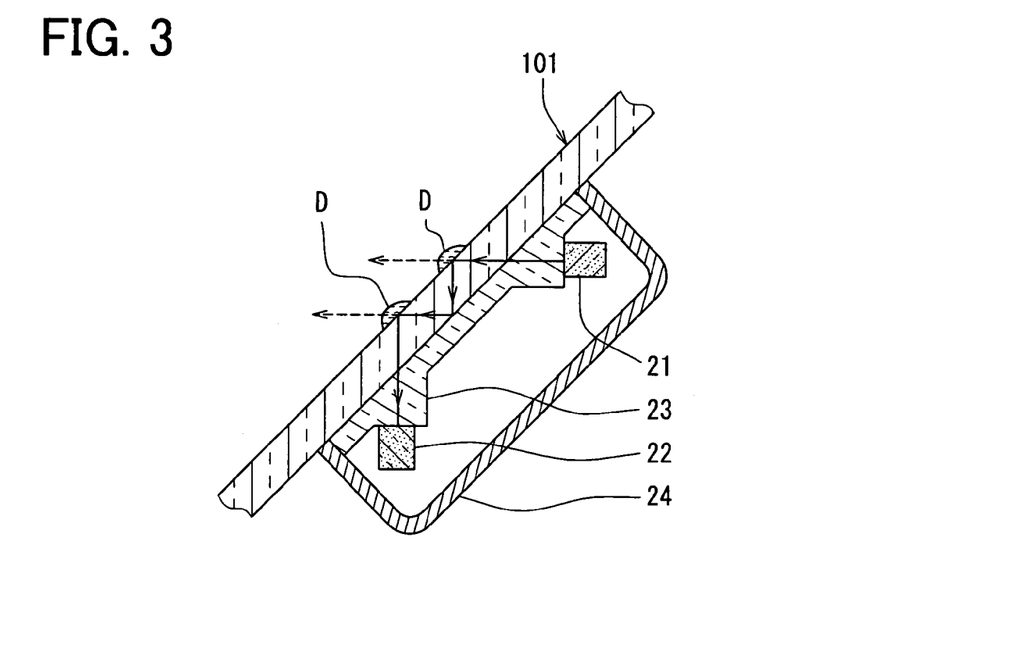
FIG. 3 is a schematic cross-sectional view showing a raindrop sensor of the raindrop detecting device taken along line III-III in FIG. 1.

As shown in FIG. 3, the raindrop sensor 20 includes a light-emitting element 21, a light-receiving element 22, a prism 23 and a casing 24. For example, the light-emitting element 21 is a light-emitting diode for emitting infrared light toward the detection area Ad of the front windshield 101. Light emitted from the light-emitting element 21 is reflected by the front windshield 101, and the reflected light is received by the light-receiving element 22.

The light-receiving element 22 outputs an output signal corresponding to an amount of the received light. The light-emitting element 21 is connected to the controller 40 through a circuit (not shown) for driving the light-emitting element, so that the controller 40 controls the light-emitting element 21. The light-receiving element 22 is connected to the controller 40 through a detecting and amplifying circuit (not shown), so that the light-receiving element 22 outputs the detection signal G1 into the controller 40, which corresponds to the raindrop amount.

When any raindrop does not exist in the detection area Ad, infrared light emitted from the light-emitting element 21 travels as shown of a solid line arrow in FIG. 3. The front windshield 101 reflects almost all the emitted light, and the reflected light is received by the light-receiving element 22. In contrast, when raindrop D exists in the detection area Ad, a part of infrared light emitted from the light-emitting element 21 passes through the raindrop D as shown of a dashed line arrow in FIG. 3. Thus, the part of infrared light travels outside of the front windshield 101.

Therefore, an amount of light received by the light-receiving element 22 is reduced, so that an amount of raindrop existing in the detection area Ad (i.e., the raindrop amount) can be optically detected based on the amount of light received by the light-receiving element 22. As the raindrop amount is increased, the detection signal G1 output from the raindrop sensor 20 becomes smaller. As the raindrop amount is decreased, the detection signal G1 output from the raindrop sensor 20 becomes larger.

The controller 40 includes a CPU for controlling and calculating, a ROM, in which program and data are stored, a writable memory (RAM), an input circuit (analog-digital converter), an output circuit and a power supply circuit (which are not shown) in reality. However, here, the controller 40 will be described by using the wiper control 41, the period control 42 and the determiner 43.

The wiper control 41 controls the activation of the wiper blade 11, 12. The period control 42 sets the prohibition period for prohibiting the determination of the raindrop amount. The prohibition period corresponds to a period, for which the wiper blade 11 passes through the detection area Ad of the raindrop sensor 20. The determiner 43 determines the raindrop amount based on the detection signal G1 output from the raindrop sensor 20 during a period allowing to perform the determination of the raindrop amount.

Because the wiper blades 11, 12 are driven through the common transmission mechanism 14, movements of the wiper blades 11, 12 are completely synchronized with each other. However, because the raindrop sensor 20 is located in the area A1 of the wiper blade 11, the wiper blade 12 never passes through the detection area Ad of the raindrop sensor 20. Therefore, the period control 42 of the controller 40 will be described by using only the wiper blade 11.

The determiner 43 inputs information regarding a present rainfall condition into the wiper control 41, and the wiper switch 30 inputs information regarding a wiping mode into the wiper control 41. The wiper control 41 controls the wiper motor 13 based on the both information. A user of the vehicle 100 manually operates the wiper switch 30 among an off mode, an auto mode, a low mode and a high mode. Movement of the wiper blade 11, 12 is stopped in the off mode. The wiper blade 11, 12 is automatically controlled in the auto mode. The wiper blade 11, 12 is moved at a relatively low speed in the low mode, and the wiper blade 11, 12 is moved at a relatively high speed in the high mode.

The wiper switch 30 is operated in order to select one mode among these four modes. When one mode is selected, the wiper switch 30 outputs information regarding the selected mode into the wiper control 41 of the controller 40.

The raindrop amount is determined based on the detection signal G1 output from the raindrop sensor 20. However, if the raindrop amount is determined when the wiper blade 11 passes through the detection area Ad of the raindrop sensor 20, the raindrop amount may not accurately be determined. For example, if raindrop existing in the detection area Ad is disturbed by the wiper blade 11, the raindrop amount may not accurately be determined. Further, if raindrop water collected by the wiper blade 11 is mistaken for the raindrop existing in the detection area Ad, or if water adhering onto the wiper blade 11 is mistaken for the raindrop existing in the detection area Ad, the raindrop amount may not accurately be determined.

Therefore, the operation signal G4 (see FIG. 2) of the wiper blade 11 is input into the period control 42 from the wiper motor 13. A single wiping operation period is started when the wiper blade 11 departs from the initial position K1, and ended when the wiper blade 11 returns to the initial position K1 via the turning position R1. A period, for which the wiper blade 11 passes through the detection area Ad of the raindrop sensor 20, is calculated using an elapse time from a rising of the operation signal G4. Thus, the prohibition period for prohibiting the determination of the raindrop amount can be set by using the period for which the wiper blade 11 passes through the detection area Ad of the raindrop sensor 20.

Specifically, the determiner 43 detects a timing that the wiper blade 11 passes through the detection area Ad based on the detection signal G1 output from the raindrop sensor 20, and outputs a passing signal G5 (see FIG. 2) of the wiper blade 11 into the period control 42. The period control 42 sets the prohibition period based on the operation signal G4 output from the wiper motor 13 and the passing signal G5 of the wiper blade 11. The prohibition period is defined to start when a predetermined period T5 (see FIG. 6) elapses after the operation signal G4 is output, and end when a predetermined period T6 (see FIG. 6) elapses after the operation signal G4 is output.

Here, the passing signal G5 of the wiper blade 11 output from the determiner 43, and a method of determining the wiper blade 11 to pass through the detection area Ad will be described. When the wiper blade 11 passes through the detection area Ad of the raindrop sensor 20, water collected by the wiper blade 11 or water adhering onto the wiper blade 11 also passes through the detection area Ad of the raindrop sensor 20. At this time, the detection signal G1 output from the raindrop sensor 20 becomes much smaller compared with a case in which a normal raindrop exists in the detection area Ad. That is, the detection signal G1 of the raindrop sensor 20 becomes small when the wiper blade 11 passes through the detection area Ad of the raindrop sensor 20.

Figure 6:
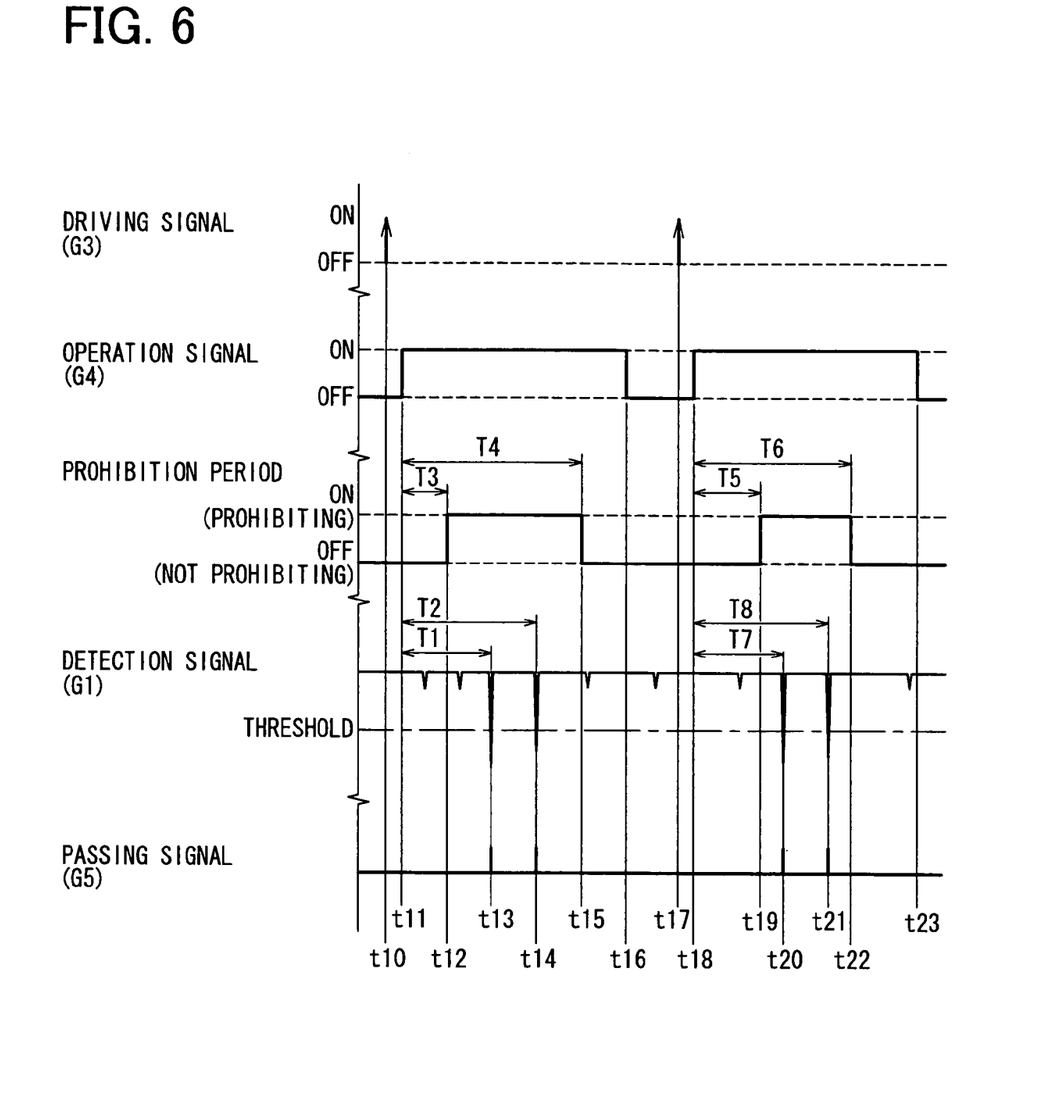
FIG. 6 is a timing chart of the raindrop detecting device.

Therefore, as shown of a timing chart of the detection signal G1 in FIG. 6, a threshold value is set by adding a predetermined leeway value to the detection signal G1 detected when the normal raindrop exists in the detection area Ad. When the detection signal G1 of the raindrop sensor 20 is compared with the threshold value, the wiper blade 11 can be determined to pass through the detection area Ad of the raindrop sensor 20 or not. The determiner 43 outputs the passing signal G5 of the wiper blade 11 based on the detection signal G1 of the raindrop sensor 20 and the threshold value. The wiper blade 11 passes through the detection area Ad of the raindrop sensor 20 twice (outward and homeward) in the single wiping operation. A first passing signal (outward signal) is output from the determiner 43 into the period control 42, when the wiper blade 11 is moved from the initial position K1 to the turning position R1. A second passing signal (homeward signal) is output from the determiner 43 into the period control 42, when the wiper blade 11 is moved from the turning position R1 to the initial position K1.

Next, a method of setting the prohibition period by the period control 42 will be described. The predetermined period T5 is calculated by subtracting a leeway period ΔT from a period T1 (see FIG. 6). The period T7 is started when the operation signal G4 of the wiper blade 11 is output, and ended when the first passing signal is output, that is when the wiper blade 11 passes through the detection area Ad of the raindrop sensor 20 while moving outward. In contrast, the predetermined period T6 is calculated by adding a leeway period ΔT to a period T2 (see FIG. 6). The period T2 is started when the operation signal G4 of the wiper blade 11 is output, and ended when the second passing signal is output, that is when the wiper blade 11 passes through the detection area Ad of the raindrop sensor 20 while moving homeward.

Thus, the prohibition period can be set based on the operation signal G4 output from the wiper motor 13 and the first and second passing signals G5 of the wiper blade 11.

If the prohibition period is set based on a position of the raindrop sensor 20 and a moving speed of the wiper blade 11 like a conventional art, a leeway period is required to be longer, because the leeway period has to be set in consideration of many factors affecting the moving speed of the wiper blade 11. When all-possible conditions regarding the moving speed of the wiper blade 11 are taken into consideration, the leeway period becomes longer, in order to completely prohibit the determination of the raindrop amount when the wiper blade 11 is located in the detection area Ad. Therefore, a rate of the prohibition period to a single wiping operation period, in which the wiper blade 11 travels outward and homeward each once, is increased, so that a period allowing to perform the determination of the raindrop amount is reduced. In this case, it may be difficult to perform an accurate determination of the raindrop amount.

In contrast, in this first embodiment, a timing that the wiper blade 11 passes through the detection area Ad of the raindrop sensor 20 can be directly detected, and the prohibition period is set based on the first and second passing signals. The leeway period ΔT is also needed in the first embodiment. However, the leeway period ΔT of the first embodiment can be much shorter than that of the above-described conventional art. Thereby, the prohibition period can be short, so that the period allowing to perform the determination of the raindrop amount can be increased. That is, accuracy for determining the raindrop amount can be improved.

Further, in this first embodiment, the period control 42 sets the prohibition period by using only the operation signal G4 output from the wiper motor 13 and the first and second passing signals G5. That is, data regarding the position of the raindrop sensor 20 is not used, so that the prohibition period can be calculated without using the position of the raindrop sensor 20.

If the position of the raindrop sensor 20 is different among plural vehicle types, the prohibition period has to be set in advance relative to each vehicle type, and input into a controller of each vehicle type. That is, each specific controller is needed relative to each vehicle type.

In contrast, in this first embodiment, the data of the position of the raindrop sensor 20 is not needed for setting the prohibition period. Therefore, the controller 40 can be used in common relative to all the vehicle types. Thereby, the above-described specific controller is not needed in the first embodiment.

Here, the prohibition period is set based on the first and second passing signals G5 detected in the single wiping operation period, and the set prohibition period is used in the next single wiping operation period. Therefore, when a user of the vehicle 100 manually operates the wiper switch 30 to select the auto mode, for example, the prohibition period is not set in a first single wiping operation period of the auto mode yet. However, the prohibition period is required to be set before the first and second passing signals G5 are detected, in order to prohibit the determination of the raindrop amount when the wiper blade 11 passes through the detection area Ad of the raindrop sensor 20.

In the first embodiment, a predetermined value is stored in a read-only memory, e.g., ROM, (not shown) of the controller 40 in advance. Therefore, the prohibition period can be set by using the predetermined value. That is, the prohibition period is started when a predetermined period T3 (see FIG. 6) elapses after the operation signal G4 is output, and ended when a predetermined period T4 (see FIG. 6) elapses after the operation G4 signal is output. The predetermined period T3, T4 is set to have the leeway period longer than that of the predetermined period T5, T6, so that the wiper blade 11 secures to pass through the detection area Ad of the raindrop sensor 20 in the prohibition period.

Therefore, this prohibition period is longer than the prohibition period set based on the first and second passing signals G5. However, the prohibition period to be used in the next single wiping operation is set based on the first and second passing signals G5. Thus, accuracy for determining the raindrop amount can be improved, because the prohibition period can be set as short as possible.

Figure 4:
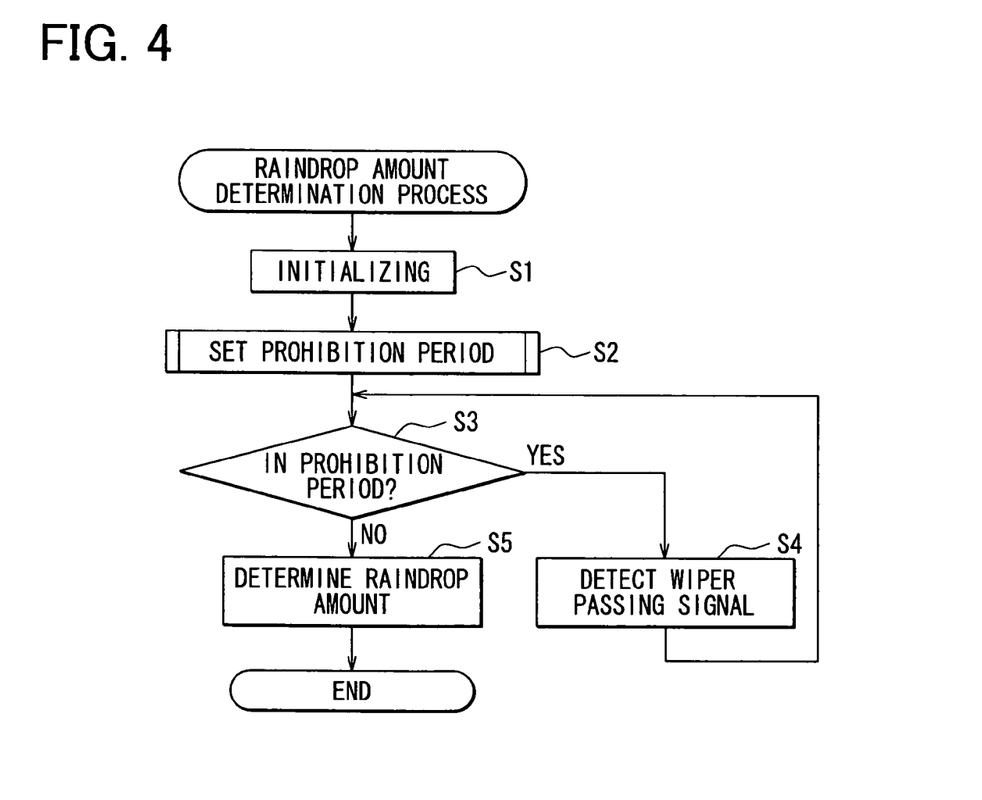
FIG. 4 is a flow chart showing a raindrop amount determination process performed by the raindrop detecting device.

Next, a raindrop amount determination process and a raindrop amount determination prohibition period setup process (hereinafter referred as a prohibition period setup process) are described with reference to FIGS. 4 and 5. The prohibition period set up process is performed in the raindrop amount determination process. FIG. 4 is a flow chart showing specific operation of the raindrop amount determination process performed by the determiner 43 of the controller 40.

When a user of the vehicle 100 manually operates the wiper switch 30 to select the auto mode, the raindrop amount determination process is started. When the raindrop amount determination process is started, the determiner 43 performs initializing, at step S1. Then, the determiner 43 has the prohibition period setup process, at step S2. The prohibition period setup process is performed by the period control 42 of the controller 40.

Next, the determiner 43 determines to be in the prohibition period or not, at step S3. When the determiner 43 is in the prohibition period (YES at step S3), that is when the wiper blade 11 passes through the detection area Ad of the raindrop sensor 20 or the adjacent area, the determiner 43 detects the passing signal G5 of the wiper blade 11 output when the wiper blade 11 passes through the detection area Ad of the raindrop sensor 20, at step S4.

In the detection of the passing signal G5 of the wiper blade 11, the detection signal G1 output from the raindrop sensor 20 is compared with the above-described threshold value. When the detection signal G1 is smaller than the threshold value, the detection signal G1 is detected as the passing signal G5 of the wiper blade 11. Then, the determiner 43 repeats step S3 and step S4, until when the determiner 43 determines to be out of the prohibition period.

In contrast, the determiner 43 is not in the prohibition period (NO at step S3), that is the determiner 43 is in a period allowing to perform the determination the raindrop amount, the determiner 43 determines the raindrop amount based on the detection signal G1 of the raindrop sensor 20, at step S5. Based on the determined raindrop amount, the wiper control 41 controls the wiper blade 11, 12 by outputting the driving signal G3 into the wiper motor 13.

Figure 5:
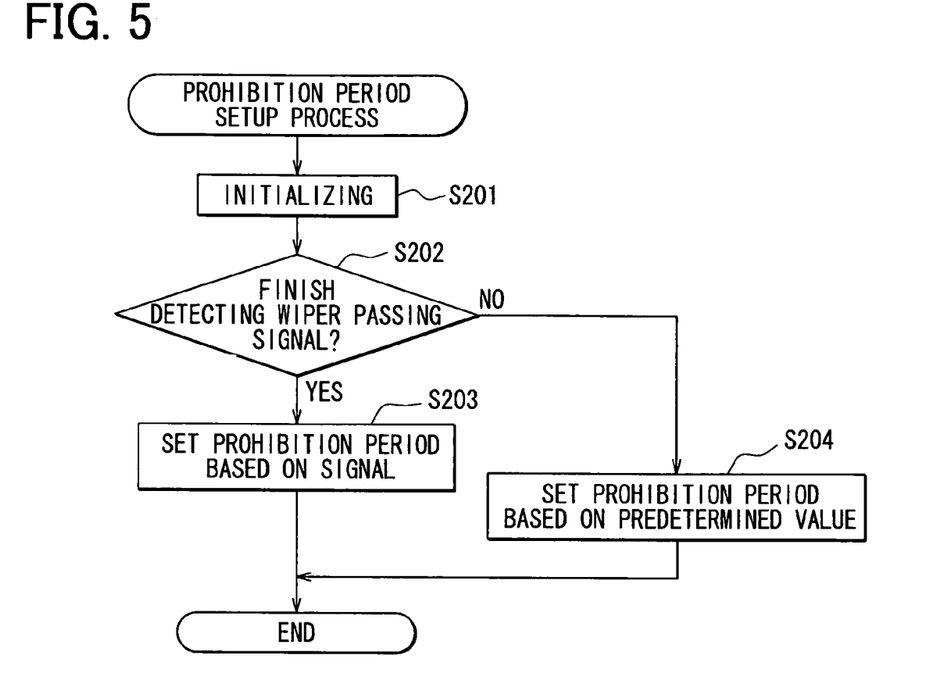
FIG. 5 is a flow chart showing a prohibition period setup process performed by the raindrop detecting device.

FIG. 5 is a flow chart showing specific operation of the prohibition period setup process performed mainly by the period control 42 of the controller 40. The period control 42 performs the prohibition period setup process, at step S2 shown in FIG. 4.

When the prohibition period setup process is started, the period control 42 performs initializing, at step S201. Then, the period control 42 determines to finish detecting the first and second passing signals G5 or not, at step S202. When the period control 42 finishes detecting the first and second passing signals G5 (YES at S202), the period control 42 sets the prohibition period based on the operation signal G4 output from the wiper motor 13 and the first and second passing signals G5, at step S203.

In contrast, when the period control 42 does not finish detecting the first and second passing signals G5 (NO at S202), the period control 42 sets the prohibition period by using the predetermined value stored in the read-only memory of the controller 40 in advance, at step S204.

FIG. 6 shows a timing chart of the raindrop detecting device 1, in which the auto mode is selected by a user of the vehicle 100 through the wiper switch 30. The raindrop amount determination process shown in FIG. 4 is already started, and the passing signal G5 of the wiper blade 11 already starts to be detected (see FIG. 5).

Under this assumption, when a raindrop exists in the detection area Ad of the raindrop sensor 20, the determiner 43 determines that the wiper blade 11, 12 is required to wipe the areas A1, A2 of the front windshield 101. Therefore, at a timing t10, the wiper control 42 outputs the driving signal G3 having a pulse shape to drive the wiper motor 13. The driving signal G3 includes information regarding a wiping level, e.g., wiping speed or wiping interval, of the wiper blade 11, 12.

When the driving signal G3 is output from the wiper control 41 into the wiper motor 13, the wiper motor 13 is changed from a stop (off) state to an operation (on) state. The state of the wiper motor 13 is changed in response to the operation signal G4 output at a timing t11, for example, which is delayed from the timing t10. Then, the wiper blade 11, 12 starts to perform a single wiping operation. That is, the wiper blade 11, 12 is moved from the initial position K1, K2 and returned to the initial position K1, K2 via the turning position R1, R2. The time delay from the timing t10 to the timing t11 is caused by a rising delay of a driving current or gear backlash, for example.

In the first single wiping operation of the wiper blade 11, 12, the prohibition period is not set, because the preceding single wiping operation of the wiper blade 11, 12 does not exist. Therefore, the prohibition period is set to start at a timing t12 after a predetermined period T3 elapses from the timing t11, and end at a timing t15 after a predetermined period T4 elapses from the timing t11.

Further, in the prohibition period, the detection signal G1 of the raindrop sensor 20 is compared with the threshold value, so that the first passing signal G5 is detected at a timing t13, and that the second passing signal G5 is detected at a timing t14. A first time period T1 is taken from the timing t11 to the timing t13, and a second time period T2 is taken from the timing t11 to the timing t14. Each of the timing t13 and the timing t14 is coincident with a timing that the wiper blade 11 passes through the detection area Ad of the raindrop sensor 20.

After the first single wiping operation of the wiper blade 11, 12 is finished, the driving signal G3 is output again at a timing t17. Then, the wiper motor 13 is changed from the off state to the on state at a timing t18. That is, the operation signal G4 is output at the timing t18. The wiper blade 11, 12 performs another (second) single wiping operation, that is, is moved from the initial position K1, K2 and returned to the initial position K1, K2 via the turning position R1, R2, again.

At this time, the period control 42 of the controller 40 sets the prohibition period of the second wiping operation using the first and second time periods T1, T2. Specifically, the period control 42 calculates a period T5 by subtracting a predetermined leeway time ΔT from the first time period T1, and calculates a period T6 by adding a predetermined leeway time ΔT to the second time period T2.

Further, the period control 42 sets the prohibition period to start at a timing t19 after the period T5 elapses from the timing t18, and to end at a timing t22 after the period T6 elapses from the timing t18, based on the operation signal G4 and the passing signals G5. Further, in the prohibition period, the detection signal G1 of the raindrop sensor 20 is compared with the threshold value, so that the next first passing signal is detected at a timing t20, and that the next second passing signal is detected at a timing t21. A first time period T7 is taken from the timing t18 to the timing t20, and a second time period T8 is taken from the timing t18 to the timing t21. The first and second time periods T7, T8 are to be used by the period control 42 in order to set the prohibition period of the next (third) single wiping operation.

Second Embodiment

A prohibition period setup process in a second embodiment is different from that in the first embodiment. In the first embodiment, the prohibition period is set to start based on the first time period T1, and to end based on the second time period T2. Therefore, the prohibition period includes a period, which is started when the wiper blade 11 outward passes through the detection area Ad, and is ended when the wiper blade 11 homeward passes through the detection area Ad. In this case, if the raindrop sensor 20 is located adjacent to the turning position R1, a period allowing to perform the determination of the raindrop amount can be made longer.

Figure 7:
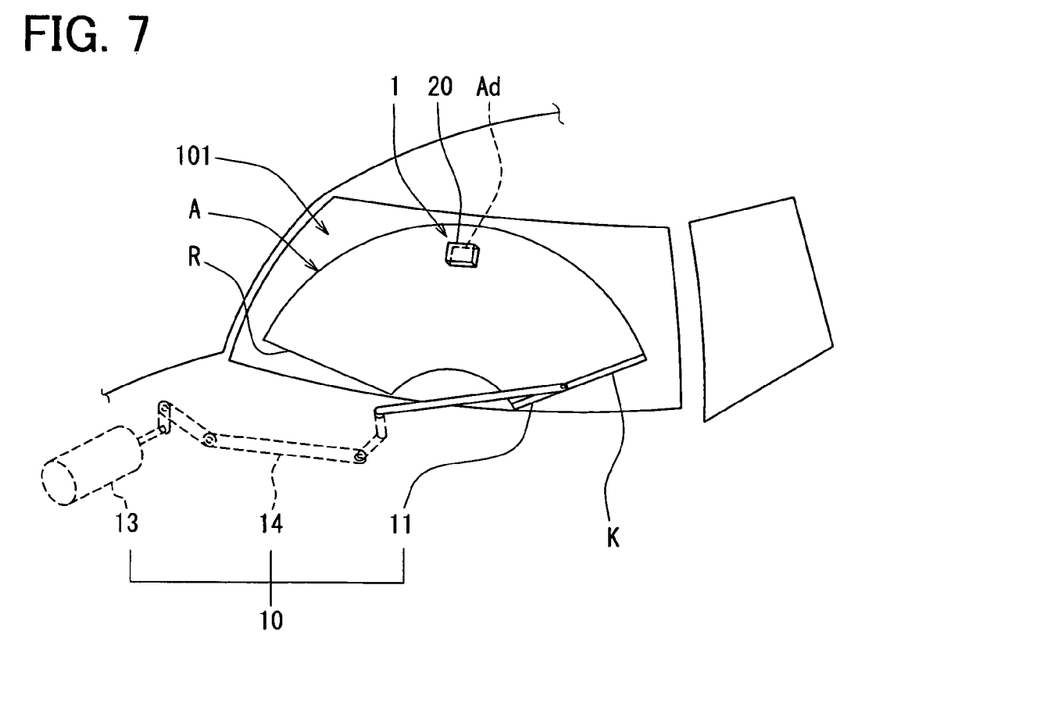
FIG. 7 is a schematic diagram showing a raindrop detecting device mounted on a vehicle, according to a second embodiment of the present invention.

However, as shown in FIG. 7, if the raindrop sensor 20 is located at an approximately center position between an initial position K and a turning position R, the prohibition period becomes longer. That is, the period allowing to perform the determination of the raindrop amount becomes shorter.

Therefore, in the second embodiment, two prohibition periods are set relative to the single wiping operation. The other parts in the second embodiment may be made similar to the first embodiment. Specifically, the two prohibition periods are constructed by a first prohibition period and a second prohibition period. The first prohibition period includes a timing that the wiper blade 11 outward passes through the detection area Ad, and the second prohibition period includes a timing that the wiper blade 11 homeward passes through the detection area Ad.

Figure 8:
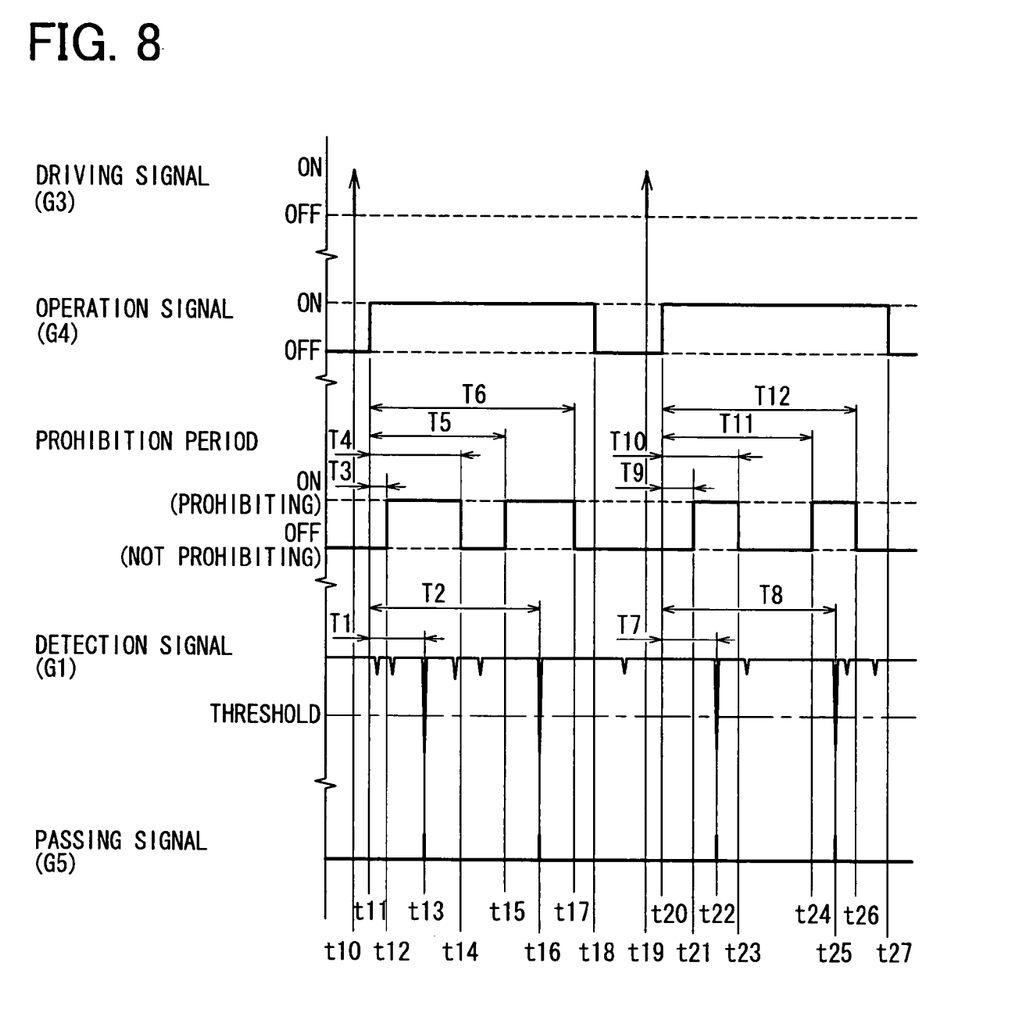
FIG. 8 is a timing chart of the raindrop detecting device of the second embodiment.

FIG. 8 shows a timing chart of the raindrop detecting device 1 of the second embodiment, in which the auto mode is selected by a user of the vehicle 100 through the wiper switch 30. The raindrop amount determination process shown in FIG. 4 is already started, and the passing signal G5 of the wiper blade 11 already starts to be detected (see FIG. 5).

Under this assumption, when a raindrop exists in the detection area Ad of the raindrop sensor 20, the determiner 43 determines that the wiper blade 11 is required to wipe an area A of the front windshield 101. Then, at a timing t10, the wiper control 41 outputs the driving signal G3 having a pulse shape to drive the wiper motor 13. The driving signal G3 includes information regarding a wiping level, e.g., wiping speed or wiping interval, of the wiper blade 11.

When the driving signal G3 is output from the wiper control 41 into the wiper motor 13, the wiper motor 13 is changed from a stop (off) state to an operation (on) state. The state of the wiper motor 13 is changed at a timing t11, for example, which is delayed from the timing t10. Then, the wiper blade 11 starts to perform a first single wiping operation. That is, the wiper blade 11 is moved from the initial position K and returned to the initial position K via the turning position R.

In the first single wiping operation of the wiper blade 11, the prohibition period is not set, because the preceding single wiping operation of the wiper blade 11 does not exist. Therefore, the first and second prohibition periods are set by using predetermined periods T3, T4, T5, T6 stored in a read-only memory, e.g., ROM, (not shown) of the controller 40 in advance. That is, the first prohibition period is set to start at a timing t12 after the predetermined period T3 elapses from the timing t11, and end at a timing t14 after the predetermined period T4 elapses from the timing t11. Similarly, the second prohibition period is set to start at a timing t15 after the predetermined period T5 elapses from the timing t1, and end at a timing t17 after the predetermined period T6 elapses from the timing t11.

Further, in each of the first and second prohibition periods, the detection signal G1 of the raindrop sensor 20 is compared with the threshold value, so that the first passing signal is detected at a timing t13, and that the second passing signal is detected at a timing t16. A first time period T1 is taken from the timing t11 to the timing t13, and a second time period T2 is taken from the timing t11 to the timing t16. Each of the timing t13 and the timing t16 is coincident with a timing that the wiper blade 11 passes through the detection area Ad of the raindrop sensor 20.

After the first single wiping operation of the wiper blade 11 is finished, the driving signal G3 is output again at a timing t19. Then, the wiper motor 13 is changed from the off state to the on state at a timing t20. The wiper blade 11 performs another (second) single wiping operation, that is, moves from the initial position K and returns to the initial position K via the turning position R, again.

At this time, the period control 42 of the controller 40 sets the first and second prohibition periods of the second single wiping operation by using the first and second time periods T1, T2. Specifically, the period control 42 calculates a period T9 by subtracting a predetermined leeway time ΔT from the first time period T1, and calculates a period T10 by adding a predetermined leeway time ΔT to the first time period T1. Similarly, the period control 42 calculates a period T11 by subtracting a predetermined leeway time ΔT from the second time period T2, and calculates a period T12 by adding a predetermined leeway time ΔT to the second time period T2.

Further, the period control 42 sets the first prohibition period of the second single wiping operation to start at a timing t21 after the period T9 elapses from the timing t20, and to end at a timing t23 after the period T10 elapses from the timing t20. Similarly, the period control 42 sets the second prohibition period of the second single wiping operation to start at a timing t24 after the period T11 elapses from the timing t20, and to end at a timing t26 after the period T12 elapses from the timing t20.

Further, in each of the first and second prohibition periods, the detection signal G1 of the raindrop sensor 20 is compared with the threshold value, so that the first passing signal is detected at a timing t22, and that the second passing signal is detected at a timing t25. A first time period T7 is taken from the timing t20 to the timing t22, and a second time period T8 is taken from the timing t20 to the timing t25. The first and second time periods T7, T8 are to be used by the period control 42 in order to set the prohibition period of the next (third) single wiping operation.

The first prohibition period (t21-t23) includes the timing t22 of the first passing signal, and the second prohibition period (t24-t26) includes the timing t25 of the second passing signal. Therefore, according to the second embodiment, accuracy for determining the raindrop amount can be improved, because the prohibition period can be set as short as possible, similarly to the first embodiment.

Further, in the second embodiment, data of the position of the raindrop sensor 20 is not needed for setting the prohibition period, similarly to the first embodiment. Therefore, when the raindrop detecting device 1 is mounted to plural vehicle types, the controller 40 can be used in common relative to all the vehicle types, so that a specific controller corresponding to each vehicle type is not needed.

Other Embodiments

In the above embodiments, the first and second passing signals G5 detected in the single wiping operation of the wiper blade 11 are used for setting the prohibition period. Alternatively, a time period may be defined to start when the operation signal G4 is output and to end when the first passing signal G5 is output, and an average value of a plurality of the time periods detected in plural wiping operations of the wiper blade 11 may be used for setting the prohibition period.

Similarly, a time period may be defined to start when the operation signal G4 is output and to end when the second passing signal G5 is output, and an average value of a plurality of the time periods detected in plural wiping operations of the wiper blade 11 may be used for setting the prohibition period. In these cases, if a moving speed of the wiper blade 11 is temporarily changed due to an external reason, the prohibition period can be set with high accuracy.

The raindrop sensor 20 is located adjacent to the turning position K1 in the first embodiment. Further, the raindrop sensor 20 is located at the upper part of the area A1 in the first embodiment, and the raindrop sensor 20 is located at the upper part of the area A in the second embodiment. However, the raindrop sensor 20 may be located at any position without departing from the scope of the present disclosure. If a front vision of a user of the vehicle 100 is secured, the raindrop sensor 20 may be located at a lower position of the front windshield 101, for example.

In the above embodiments, the raindrop detecting device 1 is mounted to the vehicle 100. Alternatively, the raindrop detecting device 1 may be mounted to a mobile object, e.g., plane, railway car or ship.

In the above embodiments, the raindrop detecting device 1 is used for the front windshield 101. Alternatively, the raindrop detection device 1 may be used for a rear windshield or a side windshield.

Such changes and modifications are to be understood as being within the scope of the present invention as defined by the appended claims.

What is claimed is:

1. A raindrop detecting device comprising:
a raindrop sensor disposed in a wiping area of a wiper blade on a front windshield, wherein the wiper blade performs a plurality of reciprocating wiping operations, and the raindrop sensor outputs a detection signal regarding a raindrop amount; and
a controller for activating the wiper blade based on the detection signal, and setting a prohibition period for which the raindrop sensor is prohibited from determining the raindrop amount while the wiper blade is activated, wherein
the raindrop sensor outputs a first signal when raindrop collected by the wiper blade passes above the raindrop sensor while the wiper blade is moved outward from an initial position in a first reciprocating wiping operation of the plurality of reciprocating wiping operations,
the raindrop sensor outputs a second signal when raindrop collected by the wiper blade passes above the raindrop sensor while the wiper blade is moved homeward to the initial position in the first reciprocating wiping operation, and
the controller calculates the prohibition period relative to a second reciprocating wiping operation to be performed after the first reciprocating wiping operation, based on the first signal and the second signal of the first reciprocating wiping operation.

2. The raindrop detecting device according to claim 1, wherein
the controller sets a first time period to start when the wiper blade departs from the initial position, and to end when the first signal is output, the controller sets a second time period to start when the wiper blade departs from the initial position, and to end when the second signal is output, and the controller calculates the prohibition period based on the first time period and the second time period.

3. The raindrop detecting device according to claim 2, wherein the controller calculates a first average for a plurality of the first time periods and a second average for a plurality of the second time periods, after a plurality of the reciprocating wiping operations is performed, and the controller calculates the prohibition period based on the first average and the second average.

4. The raindrop detecting device according to claim 2, wherein the controller calculates a starting timing of the prohibition period based on a departure timing when the wiper blade departs from the initial position, and the first time period, and the controller calculates an ending timing of the prohibition period based on the departure timing and the second time period.

5. The raindrop detecting device according to claim 4, wherein the controller sets the prohibition period to start a first predetermined period earlier than a timing when the first time period elapses after the wiper blade departs from the initial position, and the controller sets the prohibition period to end a second predetermined period later than a timing when the second time period elapses after the wiper blade departs from the initial position.

6. The raindrop detecting device according to claim 2, wherein the controller sets a first predetermined period to include a timing when the first time period elapses after the wiper blade departs from the initial position, the controller sets a second predetermined period to include a timing when the second time period elapses after the wiper blade departs from the initial position, and the controller sets the prohibition period to include the first predetermined period and the second predetermined period.

7. The raindrop detecting device according to claim 1, wherein the raindrop sensor is prohibited from determining the raindrop amount before the controller calculates the prohibition period in the first reciprocating wiping operation while the wiper blade is activated.

8. The raindrop detecting device according to claim 1, wherein the controller uses a predetermined period stored in advance as the prohibition period before the controller calculates the prohibition period in the first reciprocating wiping operation while the wiper blade is activated.

9. The raindrop detecting device according to claim 8, wherein the calculated prohibition period is shorter than the predetermined period.

10. The raindrop detecting device according to claim 1, wherein the controller allows the raindrop sensor to detect the raindrop amount in a period except for the prohibition period.

11. The raindrop detecting device according to claim 1, wherein the calculated prohibition period is shorter than an operation period during which an operation signal is output into the raindrop sensor from the controller.

12. The raindrop detecting device according to claim 1, wherein the controller sets an initial prohibition period which occurs during the first reciprocating wiping operation, and the prohibition period relative to the second reciprocating wiping operation is shorter than the initial prohibition period.

13. The raindrop detecting device according to claim 1, wherein:

the raindrop sensor outputs a third signal when raindrop collected by the wiper blade passes above the raindrop sensor while the wiper blade is moved outward from an initial position in the second reciprocating wiping operation of the plurality of reciprocating wiping operations, the raindrop sensor outputs a fourth signal when raindrop collected by the wiper blade passes above the raindrop sensor while the wiper blade is moved homeward to the initial position in the second reciprocating wiping operation, and the controller calculates the prohibition period of a third reciprocating wiping operation to be performed after the second reciprocating wiping operation, based on the third signal and the fourth signal of the second reciprocating wiping operation.

14. A method comprising:

outputting from a raindrop sensor, disposed in a wiping area of a wiper blade on a front windshield, a detection signal regarding a raindrop amount, wherein the wiper blade performs a plurality of reciprocating wiping operations;

activating the wiper blade based on the detection signal; and setting a prohibition period for which the raindrop sensor is prohibited from determining the raindrop amount while the wiper blade is activated, wherein the raindrop sensor outputs a first signal when raindrops collected by the wiper blade passes above the raindrop sensor while the wiper blade is moved outward from an initial position in a first reciprocating wiping operation of the plurality of reciprocating wiping operations, the raindrop sensor outputs a second signal when raindrops collected by the wiper blade passes above the raindrop sensor while the wiper blade is moved homeward to the initial position in the first reciprocating wiping operation, and the prohibition period is calculated, the prohibition period occurring during a second reciprocating wiping operation to be performed after the first reciprocating wiping operation, based on the first signal and the second signal of the first reciprocating wiping operation.

15. The method according to claim 14, wherein a first time period is set to start when the wiper blade departs from the initial position, and to end when the first signal is output, a second time period is set to start when the wiper blade departs from the initial position, and to end when the second signal is output, and the prohibition period is calculated based on the first time period and the second time period.

16. The method according to claim 14, wherein the raindrop sensor is prohibited from determining the raindrop amount before the controller calculates the prohibition period in the first reciprocating wiping operation while the wiper blade is activated.

17. The method according to claim 14, wherein a predetermined period stored in advance is used as the prohibition period before the controller calculates the prohibition period in the first reciprocating wiping operation while the wiper blade is activated, and the calculated prohibition period is shorter than the predetermined period.

18. The method according to claim 14, further comprising the raindrop sensor detecting the raindrop amount in a period except for the prohibition period.

19. The method according to claim 14, wherein the calculated prohibition period is shorter than an operation period during which an operation signal is output into the raindrop sensor.

* * * * *